UNITED STATES PATENT OFFICE.

ROBERT G. JACKSON, OF TACOMA, WASHINGTON.

FOOD COMPOUND.

1,035,592. Specification of Letters Patent. Patented Aug. 13, 1912.

No Drawing. Application filed May 22, 1912. Serial No. 699,051.

*To all whom it may concern:*

Be it known that I, ROBERT G. JACKSON, a citizen of the United States, residing at Tacoma, in the county of Pierce and State of Washington, have invented certain new and useful Improvements in Food Compounds, of which the following is a specification.

This invention comprehends certain new and useful improvements in food compounds and relates particularly to an improved article of this character, which is intended for use as a breakfast food or as a food for invalids or other sick persons.

The invention has for its primary object an article of this character which will be nutritious and capable of being easily digested and assimilated and to this end, the invention consists essentially in a food compound which is composed of wheat, rye and flax meal, to which bran is added, the whole being thoroughly mixed and subsequently packed in cartons or otherwise for sale and distribution.

In preparing my improved food compound I take clean, high grade wheat, rye and flax meal, and grind each of these ingredients in the proportions of thirty-two and one-half per cent. of the rye meal, twenty-five per cent. of the wheat meal and ten per cent. of the flax meal and to this I add thirty-two and one-half per cent. of prime bran. I thoroughly mix these ingredients by hand or otherwise and pack the food compound thus produced in cartons or other receptacles ready for distribution to the trade.

Manifestly, the compound is not only harmless, but on the other hand is exceedingly nutritious, capable of being easily digested and therefore efficient for use by invalids or the like or as what is commonly known as a breakfast food.

Having thus described my invention what I claim is:

The herein described food compound consisting of the following ingredients, in the following proportions, rye meal, thirty-two and one-half per cent.; wheat meal, twenty-five per cent.; flax meal, ten per cent.; and prime bran, thirty-two and one-half per cent., the said ingredients being thoroughly commingled, substantially as described.

In testimony whereof I hereunto affix my signature in the presence of two witnesses.

ROBERT G. JACKSON.

Witnesses:
L. C. STEVENSON,
MARION GRAY.